(12) United States Patent
Hrubant et al.

(10) Patent No.: US 8,584,287 B2
(45) Date of Patent: Nov. 19, 2013

(54) AIR MATTRESSES

(75) Inventors: Mark A. Hrubant, Vestal, NY (US); Soulilanhda Thepsombat, Binghamton, NY (US)

(73) Assignee: Johnson Outdoors Inc., Racine, WI (US)

( * ) Notice: Subject to any disclaimer, the term of this patent is extended or adjusted under 35 U.S.C. 154(b) by 351 days.

(21) Appl. No.: 12/969,244

(22) Filed: Dec. 15, 2010

(65) Prior Publication Data

US 2011/0154574 A1    Jun. 30, 2011

Related U.S. Application Data

(60) Provisional application No. 61/290,073, filed on Dec. 24, 2009.

(51) Int. Cl.
*A47C 27/08* (2006.01)
*A47C 27/10* (2006.01)
*A47C 27/18* (2006.01)

(52) U.S. Cl.
USPC ............. 5/706; 5/710; 5/713; 5/709; 5/655.3; 5/654

(58) Field of Classification Search
USPC .......... 5/706, 709, 710, 713, 654, 655.3, 644, 5/420, 932
See application file for complete search history.

(56) References Cited

U.S. PATENT DOCUMENTS

| | | | | |
|---|---|---|---|---|
| 2,575,764 A | * | 11/1951 | Morner | 428/72 |
| 2,691,179 A | * | 10/1954 | Kann | 5/710 |
| 2,997,100 A | * | 8/1961 | Morris | 5/708 |
| 3,042,941 A | * | 7/1962 | Marcus | 5/708 |
| 3,128,480 A | * | 4/1964 | Lineback | 5/709 |
| 3,192,540 A | * | 7/1965 | Swank | 5/655.3 |
| 3,872,525 A | * | 3/1975 | Lea et al. | 5/671 |
| 4,025,974 A | * | 5/1977 | Lea et al. | 5/709 |
| 4,149,919 A | * | 4/1979 | Lea et al. | 156/213 |
| 4,225,989 A | * | 10/1980 | Corbett et al. | 5/713 |
| 4,261,776 A | * | 4/1981 | Lea et al. | 156/213 |
| 4,914,771 A | * | 4/1990 | Afeyan | 5/713 |
| 4,980,936 A | | 1/1991 | Frickland et al. | |
| 4,999,074 A | * | 3/1991 | Afeyan | 156/204 |
| 5,152,018 A | | 10/1992 | Lea | |

(Continued)

FOREIGN PATENT DOCUMENTS

| | | |
|---|---|---|
| EP | 0142201 A2 | 5/1985 |
| EP | 0800355 B1 | 8/2003 |

(Continued)

*Primary Examiner* — Robert G Santos
(74) *Attorney, Agent, or Firm* — Reinhart Boerner Van Deuren P.C.

(57) ABSTRACT

A pad including first and second air impervious chambers adhered to one another is provided. The first air impervious chamber is provided by a plurality of fluidly interconnected air tubes. Each tube is formed between a first and a second thermo-plastic sheet. The first and second thermo-plastic sheets are affixed together at seams on opposite sides of the tubes. A first length between the pair of seams along the first thermo-plastic sheet is different than a second length between the pair of seams along the second thermo-plastic sheet. The second air impervious chamber is coupled to the first air impervious chamber. The second air impervious chamber including a core therein to provide self-inflating features to the second air impervious chamber. Methods of forming the same are provided.

21 Claims, 6 Drawing Sheets

(56) References Cited

U.S. PATENT DOCUMENTS

| | | |
|---|---|---|
| 5,282,286 A | 2/1994 | MacLeish |
| 5,552,205 A | 9/1996 | Lea |
| 5,553,339 A * | 9/1996 | Thomas ..................... 5/413 AM |
| 5,632,055 A * | 5/1997 | Graf ................................ 5/706 |
| 5,705,252 A | 1/1998 | Lea et al. |
| 5,839,140 A * | 11/1998 | Wilkerson ......................... 5/654 |
| 5,974,608 A * | 11/1999 | Haller et al. ...................... 5/709 |
| 6,651,277 B1 | 11/2003 | Marson |
| 6,802,092 B1 | 10/2004 | Klein |
| 7,120,950 B2 | 10/2006 | Garrigues |
| 7,480,952 B2 | 1/2009 | Nickerson et al. |
| 7,509,699 B1 | 3/2009 | Tresenfeld |
| 2006/0101743 A1 | 5/2006 | Nickerson et al. |
| 2006/0210766 A1 | 9/2006 | Press et al. |
| 2006/0280904 A1 | 12/2006 | Marson et al. |
| 2007/0277312 A1 | 12/2007 | Garrigues |
| 2009/0235460 A1 | 9/2009 | Hitch et al. |
| 2011/0154574 A1 * | 6/2011 | Hrubant et al. .................. 5/706 |

FOREIGN PATENT DOCUMENTS

| | | |
|---|---|---|
| JP | 2002-065405 A | 3/2002 |
| JP | 2005-006956 A | 1/2005 |
| KR | 20-1990-0000202 U | 1/1990 |
| KR | 10-2007-0029386 A | 3/2007 |
| WO | WO 96/21378 A2 | 7/1996 |
| WO | WO 00/65962 A1 | 11/2000 |
| WO | WO 03/099067 A2 | 12/2003 |
| WO | WO 2004/052637 A1 | 6/2004 |
| WO | WO 2005/007303 A1 | 1/2005 |
| WO | WO 2008/036320 A2 | 3/2008 |
| WO | WO 2008/116080 A2 | 9/2008 |
| WO | WO 2009/089077 A2 | 7/2009 |
| WO | WO 2009/094208 A2 | 7/2009 |

* cited by examiner

AIR MATTRESSES

CROSS-REFERENCE TO RELATED PATENT APPLICATION

This patent application claims the benefit of U.S. Provisional Patent Application No. 61/290,073, filed Dec. 24, 2009, the entire teachings and disclosure of which are incorporated herein by reference thereto.

FIELD OF THE INVENTION

The present invention relates to portable pads or mattresses and more particularly to inflatable and self-inflatable pads or mattresses.

BACKGROUND OF THE INVENTION

Portable mats, pads or mattresses (hereinafter referred to generally as "portable pads" or generally "pads") are typically used to provide a comfortable object to sleep on such as when camping. These portable pads may also be used to provide an alternative sleeping arrangement for visitors when they come to visit.

For convenience, a portable pad typically inflates and deflates such that the size of the portable pad is reduced for storability or maneuverability such as during hiking to a campsite. These portable pads typically fall into one of two categories, namely inflatable and self-inflating pads.

Inflatable pads require external devices to inflate the pad. The inflatable pad is typically formed from an air impervious bladder (formed from one or more sheets of material) that forms one or more cells that can be filled with air. Typically, there is a valve for deflating the bladder. The impervious bladder is free of any objects such that the user must manually inflate the bladder.

Self-inflating pads typically include an air impervious bladder, similar to the inflatable pads, but some object is placed within the bladder that causes the bladder to expand without assistance by the operator. Typically, this object is an open cell foam or core. To self-inflate the pad, the user will open the valve allowing air to flow into the bladder. With the bladder open to the ambient, the foam or core within the bladder will expand drawing air into the bladder. Once the foam or core is fully expanded, the user will close the valve trapping the drawn in air within the bladder increasing the rigidity of the pad. To then deflate the self-inflating pad, the user will open the valve and collapse or otherwise compress the foam within the bladder to expel the air trapped therein. With the air expelled, the user will once again close the valve preventing air from entering the bladder. This will create a vacuum that prevents the foam from expanding thus maintaining the self-inflating pad in a smaller size permitting it to be more easily stored or carried.

Self inflating pads and inflatable pads provide differing desirable characteristics. Typically, inflatable pads provide value for their increased compactibility because they are formed from limited amount of material (thin films) and can be easily rolled or folded into a small package. Further, the inflatable pads provide improved conformability to the ground as well as the curves of the user. However, self-inflating pads provide value as they provide increased thermal protection and cushioning from the ground. Unfortunately, due to the inclusion of the internal core, these pads typically have a larger package in the deflated state.

BRIEF SUMMARY OF THE INVENTION

In one embodiment, the invention provides an improved hybrid pad. The pad includes a first air impervious chamber provided by a plurality of air tubes. Each tube is formed between a first and a second thermo-plastic sheet. The first and second thermo-plastic sheets are affixed together at seams on opposite sides of the tubes. A first length between the pair of seams along the first thermo-plastic sheet is different than a second length between the pair of seams along the second thermo-plastic sheet. A second air impervious chamber is also provided. The second air impervious chamber is coupled to the first air impervious chamber. The second air impervious chamber includes a core therein.

By providing different lengths along the different sheets, embodiments provide a way to preform a third dimension into the first air impervious chamber upon inflation thereof. More particularly, the first thermo-plastic sheet is preformed with extra material between the adjacent seams that expands in a third dimension (i.e. perpendicular to the length and width dimensions defining the sheet in a deflated state) upon inflation of the first air impervious chamber without affecting significant reduction in the length and width of the second thermo-plastic sheet during inflation.

Thus, in one embodiment, when deflated, the first sheet will have excess slack material formed between the adjacent sheets.

In some embodiments, the first and second lengths are only different along the first and second sheets in an inflated state. However, the first and second lengths along the first and second sheets are the same in a deflated state. This can be accomplished by providing a first sheet that can stretch or deform more easily than the second sheet such that as the first air impervious chamber is being inflated the first sheet will deform such that the first and second lengths will differ.

In one embodiment, a third thermo-plastic sheet affixed to the second thermo-plastic sheet to define the second air impervious chamber. More preferably, the second and third thermo-plastic sheets are affixed to the core. Even more preferably, the core is a self-inflating core.

Typically, the first length is greater than the second length. In some embodiments, some or all of the thermo-plastic sheets are part of a laminated thermo-plastic fabric.

In some embodiments, the first air impervious chamber is an air-tube chamber free of any core therein.

In another embodiment, a method of manufacturing a pad is provided. The method includes the steps of: forming a second air impervious chamber including a core therein from a thermo-plastic material; and adhering at least one first sheet of a thermo-plastic material to the thermo-plastic material of the second air impervious chamber to form a first air impervious chamber including adhering the at least one first sheet to the thermo-plastic material of the second air impervious chamber at two seams to define at least a portion of the first air impervious chamber therebetween. The length between the two seams along the at least one first sheet is greater than the length between the two seams along the thermo-plastic material forming the second air impervious chamber.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
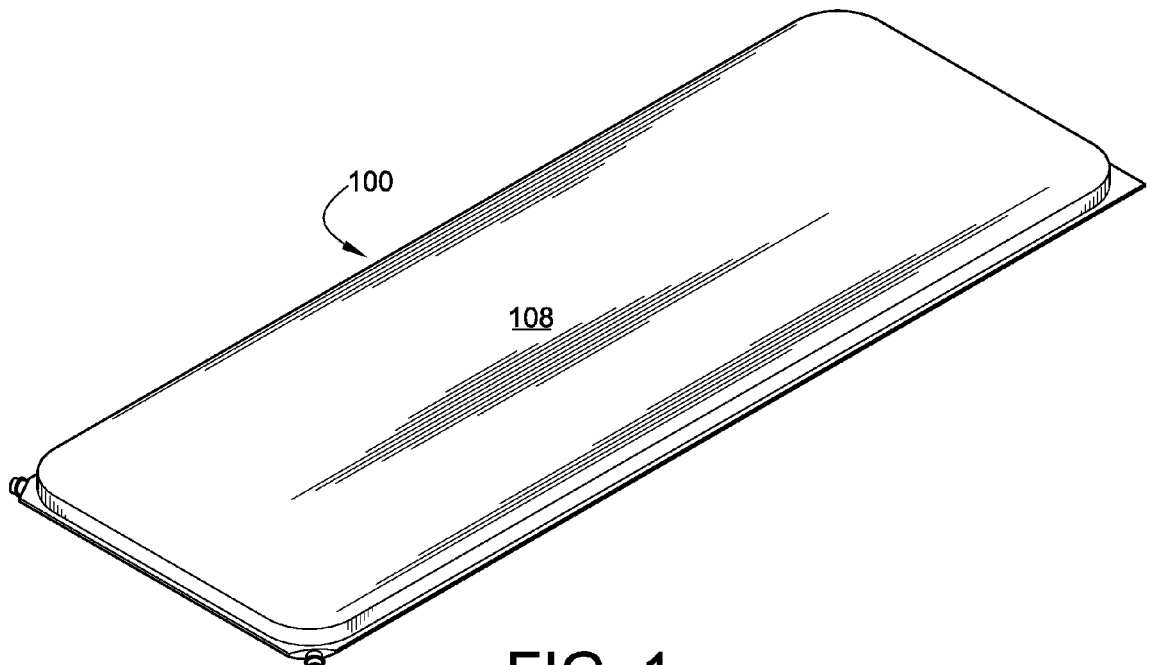
FIG. 1 is a view of a first side of a portable pad according to an embodiment of the present invention.
Figure 2:
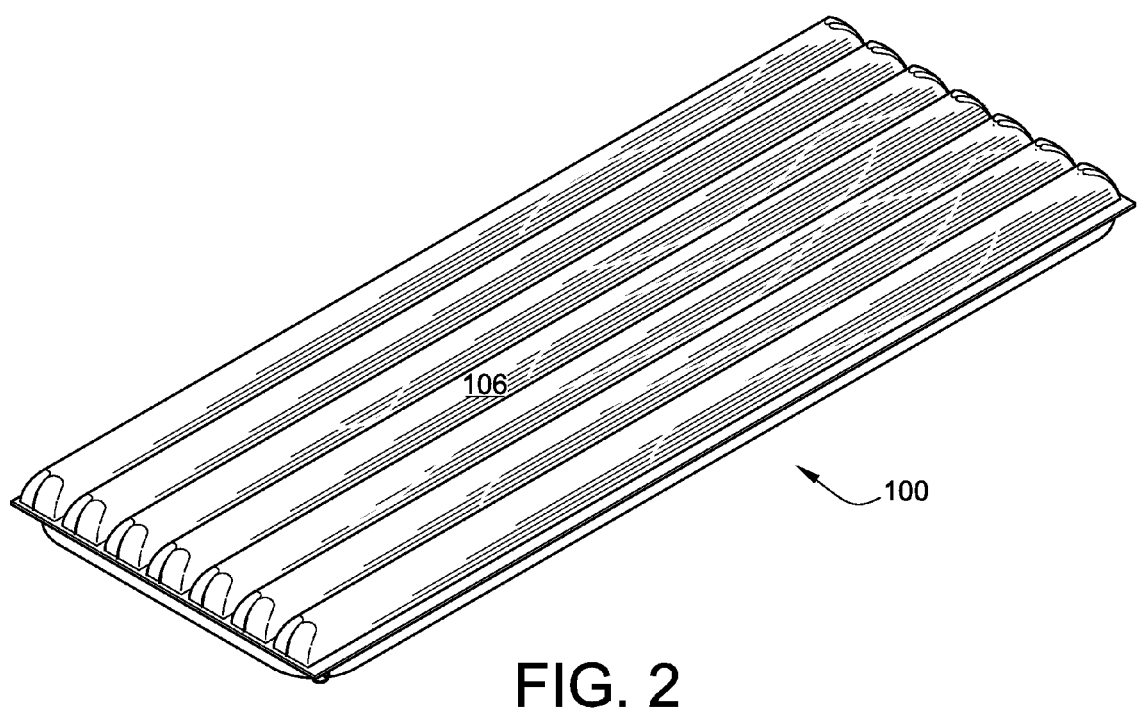
FIG. 2 is a view of an opposite second side of the portable pad of FIG. 1.

FIG. 1 illustrates an embodiment of portable pad 100 in accordance with the present invention. While illustrated as a continuous pad, in other embodiments, the pad 100 could include a body section upon which a user's body will rest separated from a pillow section upon which a user's head will rest when laying on pad 100. FIG. 2 is a further illustration of pads 100 according to the invention, illustrating an opposite thereof as illustrated in FIG. 1.

The portable pad 100 is a hybrid pad that incorporates both an inflatable pad and a self-inflatable pad into a single pad to obtain the beneficial characteristics of both styles of pads. More particularly pad 100 provides the insulation and cushioning of a self-inflating pad with the conformability, support and reduced pack size of an inflatable pad (also referred to as an "air tube pad" or "air tube mat").

Figure 3:
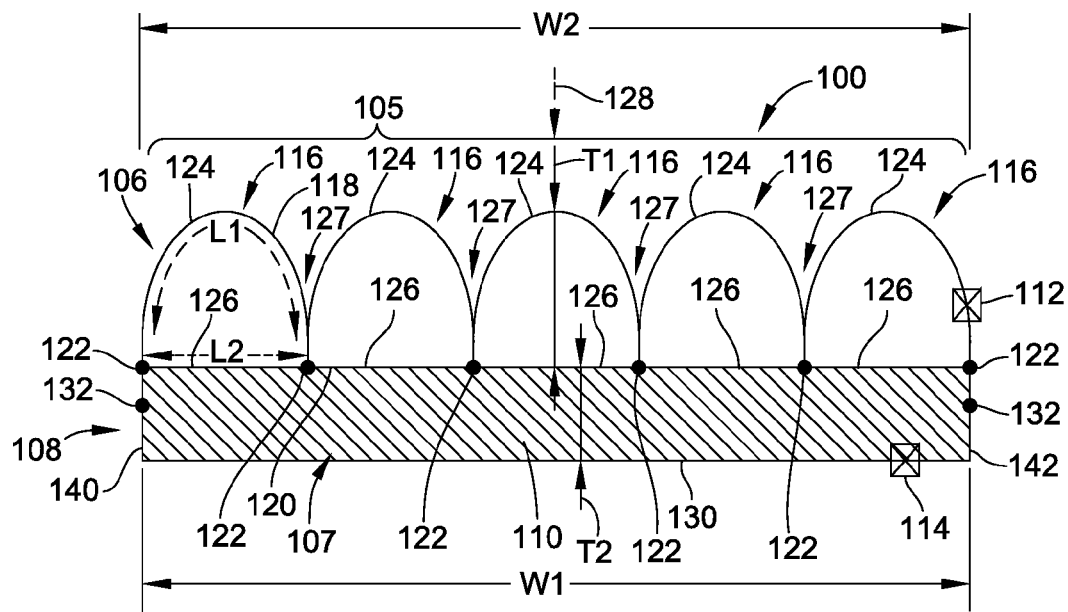
FIG. 3 is a simplified cross-sectional illustration of the portable pad of FIG. 1.

With reference to FIG. 3, a schematic cross-sectional representation of pad 100 is illustrated. The pad 100 includes a first layer that provides a first air impervious chamber 105 that is provided by an air tube layer 106 (i.e. a layer similar to an inflatable pad). Air tube layer 106 must be manually inflated, such as using a pump or blowing into the first air impervious chamber 105. Typically, the thickness T1 of the air tube layer 106 is between about five (5) centimeters and ten (10) centimeters. However, other thicknesses are contemplated.

Pad 100 also includes a second layer that provides a second air impervious chamber 107 that is provided by a self-inflating layer 108 (i.e. a layer similar to a self-inflating pad). The self-inflating layer 108 includes a self-inflating core 110. The core 110 assists in self-inflating the self-inflating layer 108 as is known in the art when the second air impervious chamber 107 is in fluid communication with the ambient environment. This core could be any known core used for self-inflating pads. Typically, the thickness T2 of the self-inflating layer 108 is between about two (2) centimeters and five (5) centimeters. Further, the thickness T2 of the self-inflating layer 108 is typically, but not always, less than the thickness T1 of the air tube layer 106.

Thus, as pad 100 includes both an air tube layer 106 and a self-inflating layer 108, the benefits of both types of pads are provided in pad 100.

Air tube layer 106 includes valve 112 to selectively seal and unseal the first fluid impervious chamber 105. Self-inflating layer 108 includes a valve 114 to selectively seal and unseal the second fluid impervious chamber 107.

In one embodiment, the air impervious chamber 105 of the air tube layer 106 is formed from a plurality of inter-connected elongated tubes 116. These tubes 116 are formed between first and second sheets 118,120, operably affixed to one another. In the illustrated embodiment, the first and second sheets are affixed to one another at seams. In a preferred embodiment, these seams are provided by welds 122 using heat welding to form welds 122. However, in other embodiments, the welds 122 could be replaced by other methods of adhering the sheets together, such as chemical or adhesive bonding.

In one embodiment, tubes 116 include a lobed portion 124 and a base portion 126. In an embodiment, all of the lobed portions 124 of the tubes 116 are formed from the first sheet 118, with the first sheet 118 being a continuous one-piece construction. However, in alternative embodiments, the lobed portions 124 could be formed from individual sheets or a plurality of sheets coupled together which would not be considered a "one-piece construction" as used herein.

The second sheet 120 provides a base portion 126 for each of the tubes 116. For reasons that will be discussed more fully below, the length L1 along sheet 118 for each lobed portion 124 between adjacent welds 122 (illustrated in simplified form as arched dashed arrow 128) is different than the length L2 along sheet 120 for each base portion 126. Typically, length L1 will be greater than length L2. In some embodiments, length L1 is at least 1.5 times length L2. In further embodiments, length L1 is at least 1.75 times length L2. In further embodiments, length L1 is at least 2 times length L2. Lengths L1 and L2 are perpendicular to the elongated length of the overall pad 100, which is typically between about 48 and 96 inches and are generally aligned with the width of the pad 100 (the width of the pad being generally perpendicular to the length of the pad 100), which is typically between about 18 and 35 inches. A typical inflated thickness of the pad, perpendicular to the length and width, is between about 2 inches and 8 inches. It should be noted that these are representative dimensions but not the only dimensions that can be used.

When pad 100 inflates, grooves 127 are formed between adjacent lobed portions 124. Thus, when viewing pad 100 from the air tube layer side 106, such as along sight arrow 128, the pad 100 has the appearance of an inflatable pad (i.e. an air tube mat).

In an embodiment, a third sheet 130 is welded to the second sheet 120 to form the second air impervious chamber 107. Second and third sheets 120, 130 can be welded at welds 132 along the sides 140, 142 of the self-inflating layer 108. Alternatively, welds 132 can be omitted and all three sheets 118, 120,130 can be welded together proximate the outer welds 122 that are not interposed between adjacent ones of the tubes 116.

In preferred embodiments, first and third sheets 118 and 130 are formed from a laminated fabric that includes a thermo-plastic urethane layer that facilitates the heat welding discussed previously. A fabric layer provides toughness to the sheets and protects the thermo-plastic urethane layer from damage due to contact with the ground or punctures due to the user resting on the pad 100.

The second sheet 120, when it does not form an exposed sides of pad 100, can be simply a thermo-plastic film free of any fabric layers. This is because, in this embodiment, the second sheet 120 is fully protected by the other two sheets 118, 130 that, in that arrangement, provide the outer periphery of the pad 100.

The second and third sheets 120, 130 are preferably bonded, typically heat bonded, to the core 110. This prevents ballooning of the second air impervious chamber 107 when a user adjusts the pressure within the second air impervious chamber 107 by manually pumping up the second air impervious chamber 107 after self-inflation has occurred.

While the second sheet 120 is used to form both the first and second air-impervious chambers 105, 107, this arrangement shall be considered as having the first and second air impervious chambers 105, 107 adhered to one another, i.e. via second sheet 120. Alternatively, each chamber could be formed independently and then adhered together.

The air tube layer 106 of pad 100 is different than and manufactured differently than a standard inflatable pad.

Figure 4:
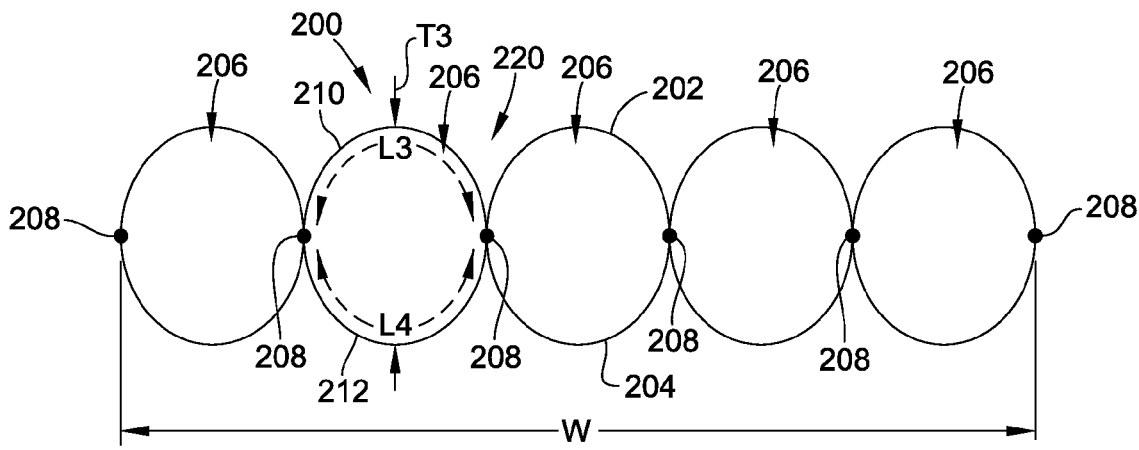
FIG. 4 is a simplified cross-sectional illustration of a prior art inflatable pad.

With reference to FIG. 4, a typical inflatable pad 200 (i.e. an air tube pad) is illustrated in simplified form. This style of pad is formed from a pair of thermo plastic sheets 202, 204 that are welded together to define a large chamber. The large chamber is typically segmented into a plurality of smaller interconnected chambers 206 that are in the form of elongated air tubes. Adjacent chambers 206 are separated by welds 208 running the length of the sheets.

These smaller chambers 206 are formed by laying the two sheets 202, 204 of the thermo plastic material flat and one on top of the other and then welding the two sheets 202, 204 together at desired intervals to form the chambers 206 (e.g. elongated "tubes") between adjacent ones of the welds 208. Thus, opposite sides of each chamber 206, such as sides 210, 212 in FIG. 4 are formed from material of the respective sheet 202, 204 from which that side is formed that are a same length (i.e. lengths L3 and L4 are substantially identical). Thus, as the pad 200 is inflated, both sides of the pad 200 expand equally in the thickness T3 direction while the mattress will tend to shrink in width W direction due to the expansion in thickness T3 causing more and more of sheets 202, 204 to be converted from being oriented perfectly horizontal to more vertical (horizontal and vertical used merely for illustrative and non-limiting purposes based on the orientation of the pad 200 in FIG. 4). Further, this causes grooves 220 to be formed between adjacent ones of the chambers 206.

This construction, makes the formation of an inflatable pad 200 relatively simple.

Unfortunately, if this construction of an air chamber was used for the air tube layer 106 of pad 100, when the air tube layer 106 is inflated, the applicants have determined, that this will cause the overall pad 100 to curl. This is caused by an increased reduction in the width W of the inflatable pad 200 construction as thickness T3 increases as compared to a similar amount of reduction in width W1 of the self-inflatable layer 108. This is because only sides 140, 142 provide the only two vertical walls such that less material of the second and third sheets 120, 130 is transition from a horizontal orientation to a vertical orientation during inflation of the second air impervious chamber 107 (again, horizontal and vertical are used solely for relative directions and are not limiting such that the pad could be rotated 90 degrees and have the same meaning).

More particularly, as standard inflatable pads 200 are inflated, more of the sheet is used to define a third dimension than a standard self-inflatable pad (similar to layer 108) because each tube of an inflatable pad requires vertical sidewalls to be formed from the sheets of material. Standard self-inflatable pads only have two sidewalls that reduce the width and convert those portions of the width of the sheet into a third dimension, i.e. thickness.

For instance, a standard inflatable pad 200 having a width W of approximately twenty-nine (29) centimeters when deflated can shrink to width W of approximately twenty (20) centimeters when inflated. This reduction in width is about a thirty (30) percent reduction in width. However, a self-inflating pad having a similar deflated width may have a reduction in width of less than fifteen (15) percent or less upon inflation. This difference in reduction in width will cause the overall combined structure, if coupled together, to curl.

Thus, if first sheet 118 were directly welded to second sheet 120 in this manner, the width W2 of the air tube layer 106 would tend to reduce a greater amount than the width W1 of the self-inflating layer 108.

To overcome the curling problem, the applicants determined that the configuration of providing different lengths of material between adjacent welds 122 along first and second sheets 118, 120, as discussed above. This compensates for and reduces the amount of reduction of width of layer 106 upon inflation. In this arrangement, the vertical dimension (as illustrated in FIG. 3 only) provided by lobed portions 116 is substantially preformed into the first sheet 118 and is substantially entirely formed by the first sheet 118 while the second sheet 120 is allowed to remains substantially horizontal (allowing for minor deflection toward the core 110). Thus, only limited reduction in the width of the second sheet 120 is applied due to inflation of the lobes 116.

Unfortunately, by providing different lengths of material along the first and second sheets 118, 120 between welds 122, the first and second sheets 118, 120 could not merely be laid flat one on top of the other and then heat welded together to form adjacent tubes 116.

Therefore, embodiments of the invention include a method of forming pad 100.

One method includes the following steps. The self-inflatable layer 108 is first formed, including surrounding the core 110 with the second and third sheets 120, 130. This can include heat bonding the second and third sheets 120, 130 to the core 110. Then, the first sheet 118 is bonded to self-inflatable layer 108, and in some embodiments, the second sheet 120. During this step, the individual welds 122 are formed to form tubes 116.

Figure 5:
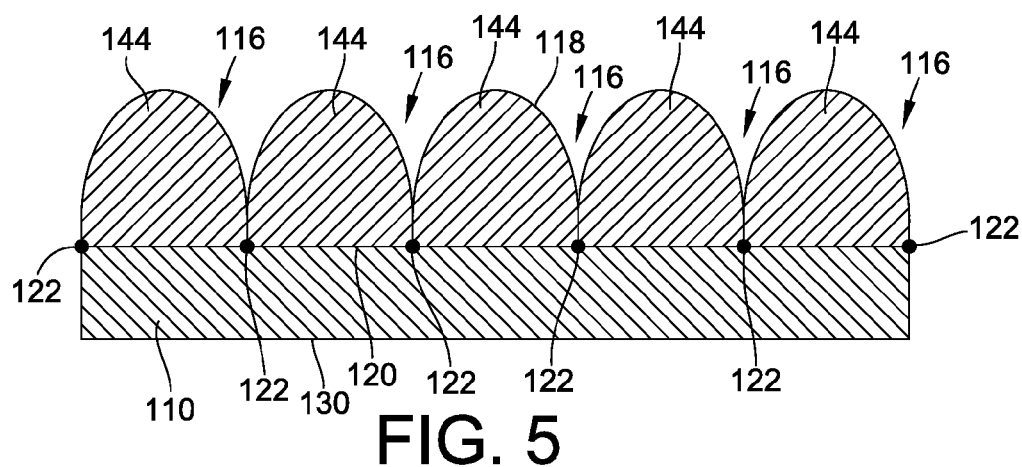
FIG. 5 is a simplified cross-section illustration of the portable pad of FIG. 1 during the manufacturing process illustrating manufacturing forms within the air tubes of the air tube layer of the portable pad.
Figure 6:
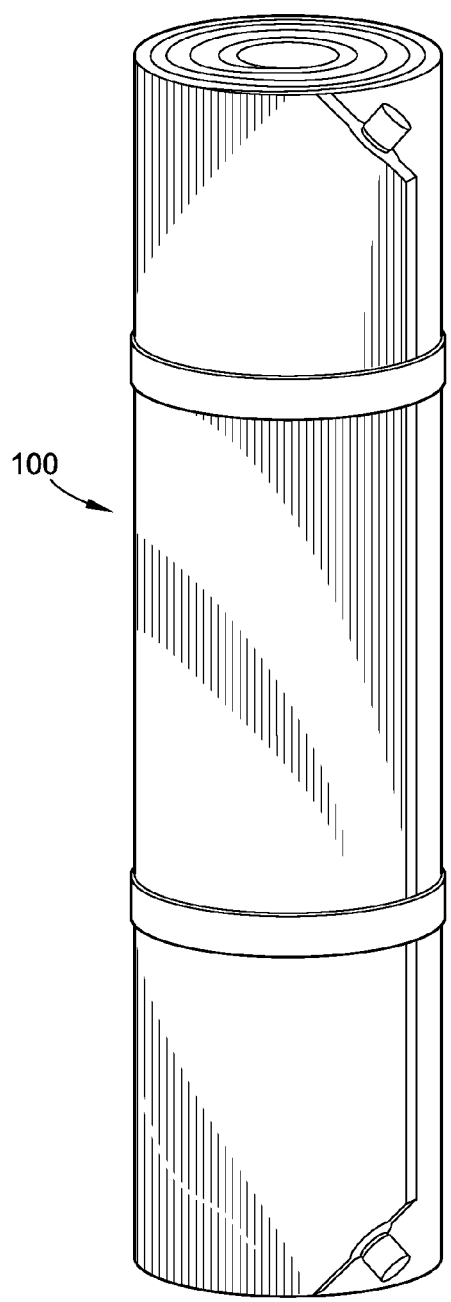
FIGS. 6 and 7 are side and end view illustrations of the portable pad of FIG. 1 in a deflated state in a rolled-up state.
Figure 7:
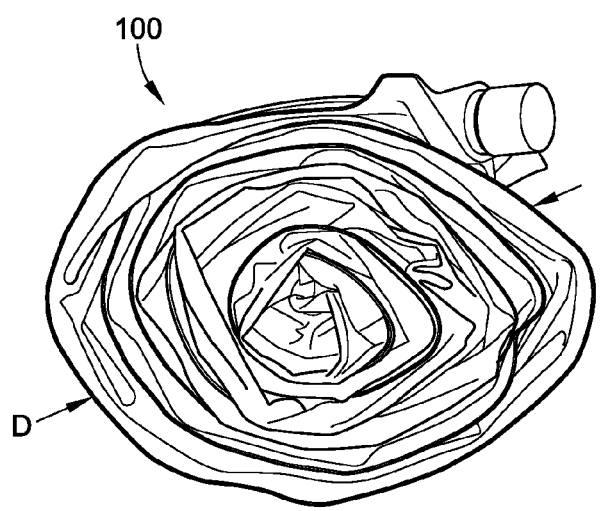

During this step, the first sheet 118 is not laid flat against the second sheet 120. In some embodiments, as illustrated in FIG. 5, the method includes placing at least one temporary form 144 between the first sheet 118 and the second sheet 120 prior to forming welds 122. The first sheet 118 is formed over the top of the one or more forms 144 to form the individual tubes 116.

Forms 144 need not be in the shape of tubes 116 when tubes 116 are inflated. Instead, the forms 144 need only take up sufficient space that the desired length L1 of material of the first sheet 118 as measured along the first sheet 118 is provided between the two contact points between the first and second sheets 118, 120 during the welding process.

A single form 144 could be used to form each tube such that each tube 116 is formed sequentially. Alternatively, an individual form 144 for each tube, as illustrated in FIG. 5, could be used.

After welds 122 have been formed, the ends of tubes are operably closed to finish forming the first air impervious chamber 105, while maintaining the various tubes 116 operably in fluid communication with one another and valve 112.

While the present invention has been describe in terms of welding the various sheets together, it should be noted that adhesive materials could be used instead. Further, the second and third sheets 120, 130 could be formed from more or less than two separate sheets.

Further, it can be seen that this hybrid pad 100 provides benefits of both a standard inflatable pad (i.e. air tube pad) as well as a standard self-inflating pad (i.e. pad having an internal core structure). Further, when comparing the hybrid pad 100 to prior art inflatable pads or self-inflating pad, pad 100 has some distinct advantages. For instance, taking a pad 100 having the same fully inflated dimensions in comparison to a prior art self-inflating pad can be condensed or packaged down into a smaller deflated foot print because less internal core is required, however, the benefits of the internal core are still be provided.

These pads are typically between about 18 and 35 inches wide and between about 48 and 96 inches long. A typical tube has a width of approximately between about 1.5 inches and 5 inches and a height of between about 1.5 inches and 6 inches. Thus, the length of welds 122 is typically between about 48 and 96 inches long.

Figure 8:
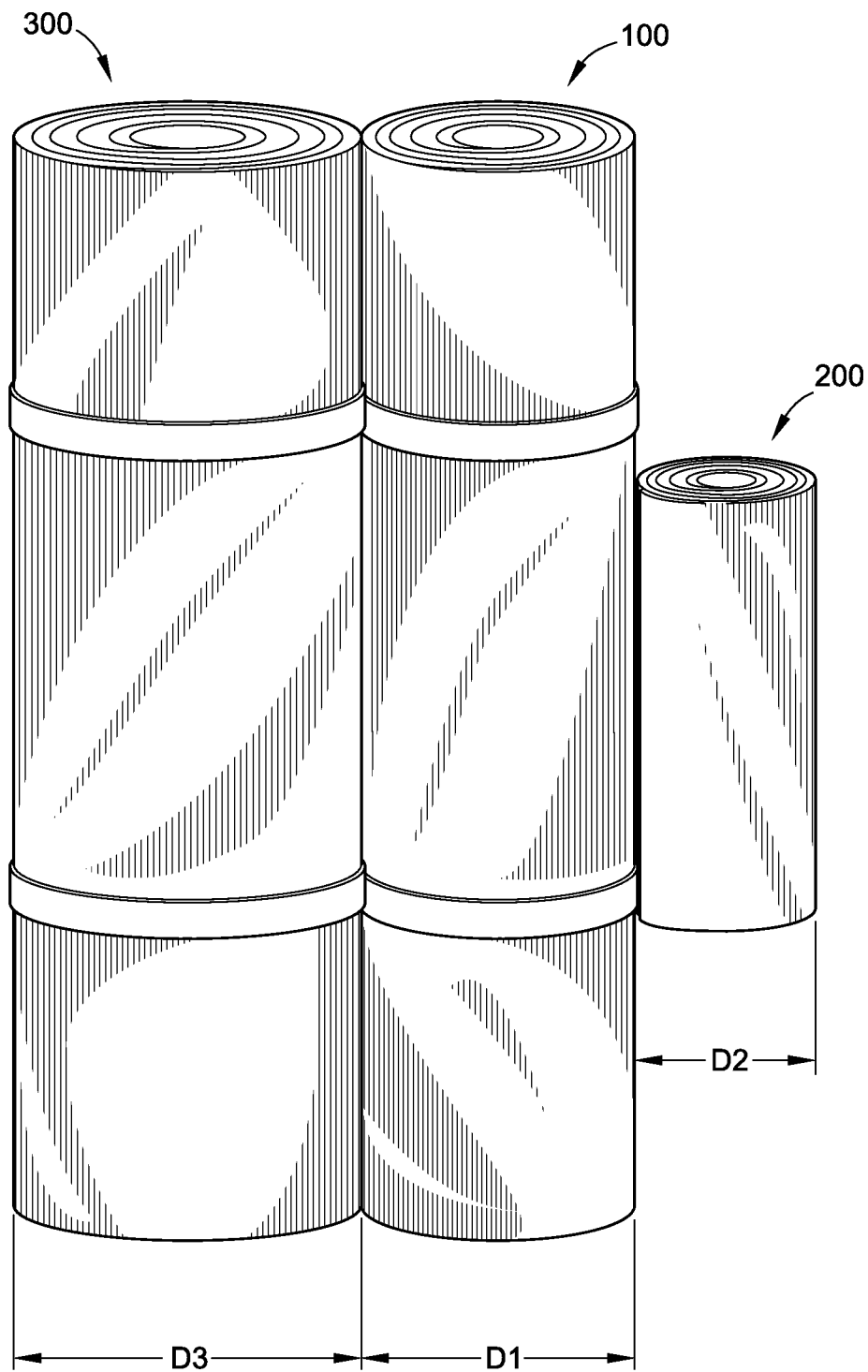
FIGS. 8-10 are illustrations comparing the deflated and packed or rolled size of an embodiment of a pad according to the present invention, a self-inflating pad, and an inflatable pad.
Figure 9:
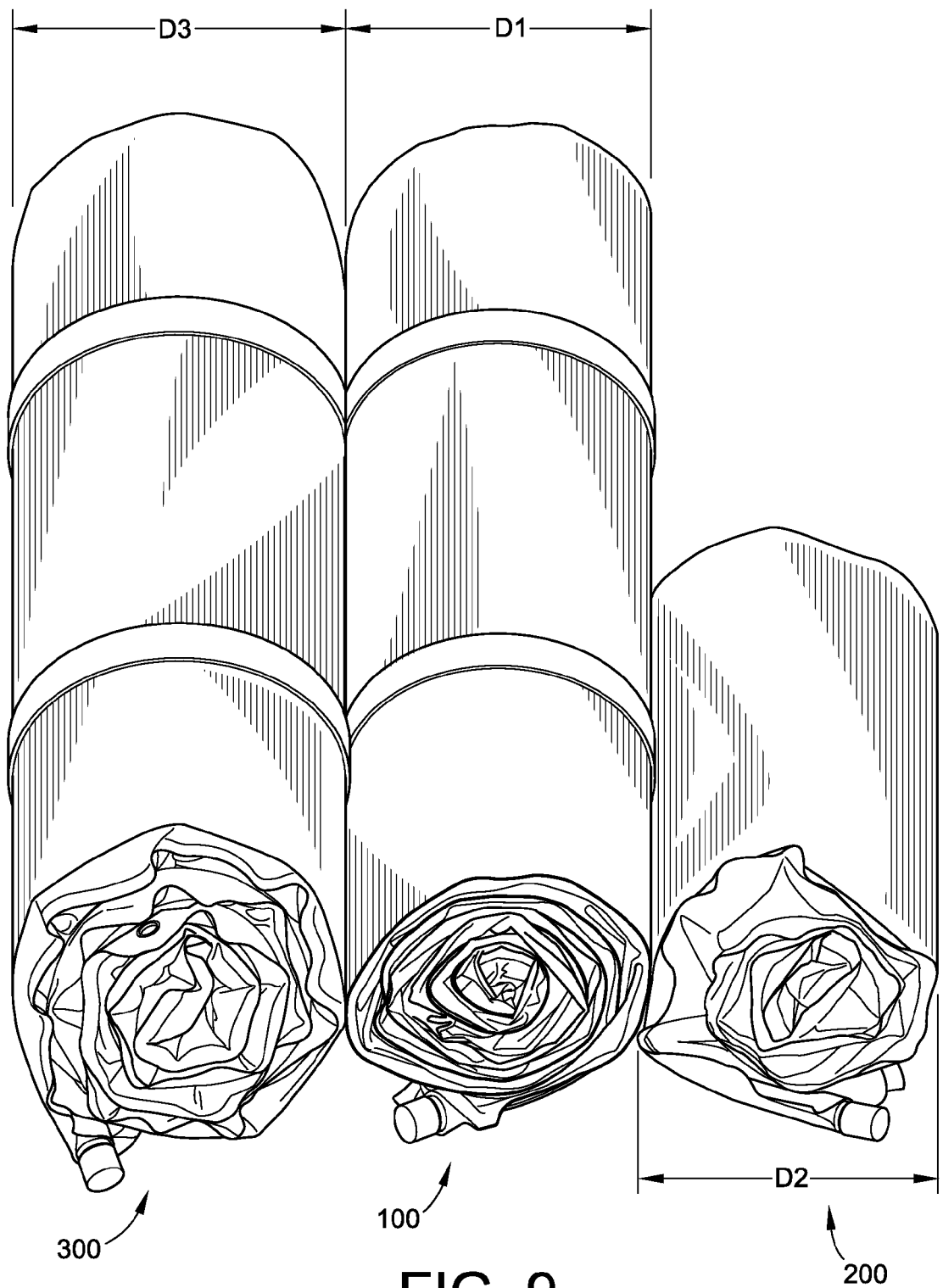
Figure 10:
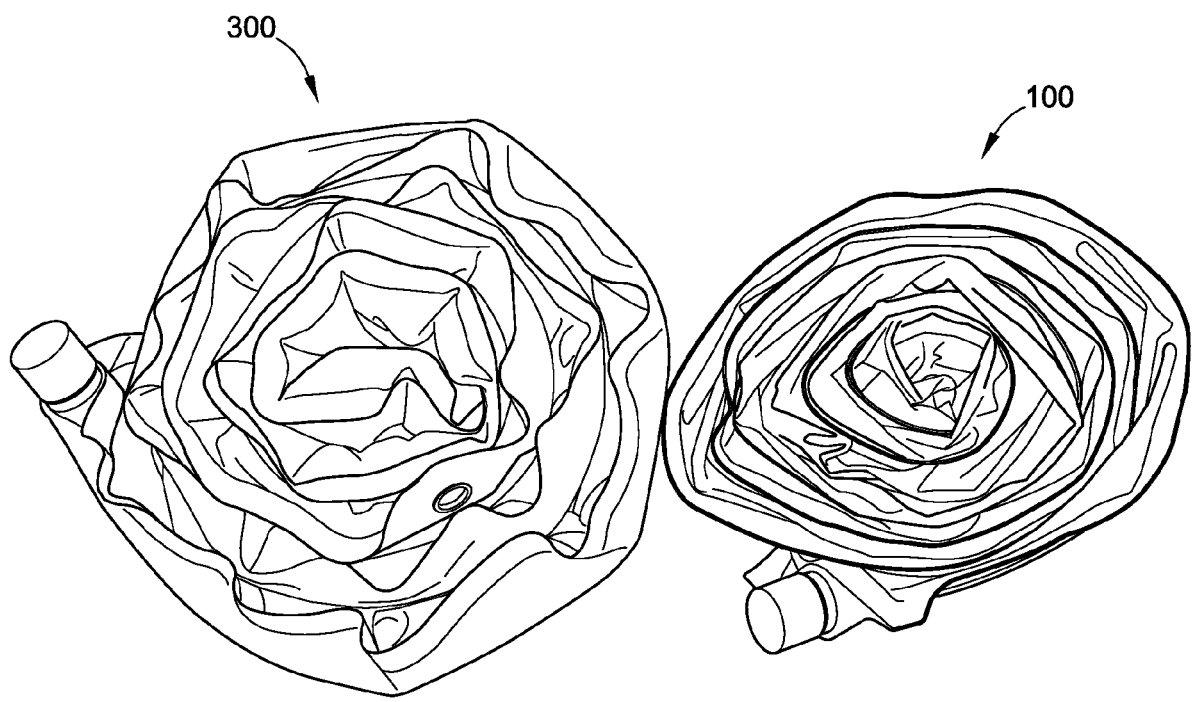

With reference to FIGS. 8-10, a pad 100 according to an embodiment of the present invention, a standard inflatable pad 200, and a standard self-inflating 300 pad are illustrated. These pads 100, 200, 300 all have substantially similar inflated dimensions in length, width and thickness. However, as can be seen from FIGS. 8 and 9, the volume and size of the hybrid pad 100 is significantly smaller than the size and volume of the standard self-inflating pad 300. In some embodiments, in the deflated and rolled state, the volume of the hybrid pad 100 is no more than 75% of the volume of a standard self-inflating pad 300, in further embodiments, the volume of the hybrid pad 100 is no more than 50% of the volume of a standard self-inflating pad 300, and in even further embodiments, the volume of the hybrid pad 100 is no more than 35% of the volume of a standard self-inflating pad 300. Clearly, the volume of the hybrid pad 100 is larger than the volume of the inflatable pad 200. The core of the hybrid pad 100 and self-inflating pad 300 are formed from a similar foam material.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A pad comprising:
   a first air impervious chamber provided by a plurality of air tubes, each tube being formed between a first and a second thermo-plastic sheet, the first and second thermo-plastic sheets being affixed together at seams on opposite sides of the tubes, wherein a first length between the pair of seams along the first thermo-plastic sheet is different than a second length between the pair of seams along the second thermo-plastic sheet; and
   a second air impervious chamber, the second air impervious chamber being coupled to the first air impervious chamber, the second air impervious chamber including a core therein.

2. The pad of claim 1, further comprising a third thermo-plastic sheet affixed to the second thermo-plastic sheet, the second thermo plastic sheet forming part of both the first and second air impervious chambers.

3. The pad of claim 2, wherein the second and third thermo-plastic sheets are affixed to the core.

4. The pad of claim 3, wherein the core is a self-inflating core.

5. The pad of claim 1, wherein the first length is greater than the second length.

6. The pad of claim 2, wherein the first and third thermo-plastic sheets are part of a laminated thermo-plastic fabric.

7. The pad of claim 1, wherein the first air impervious chamber is an air-tube chamber free of any core therein.

8. The pad of claim 1, wherein the first and second seams are heat welds.

9. The pad of claim 1, wherein the first sheet is a continuous one-piece construction.

10. The pad of claim 1, wherein the first air impervious chamber defines a first layer and is the only chamber of the first layer and the second air impervious chamber defines a second layer and is the only chamber of the second layer.

11. The pad of claim 10, wherein the first and second layers are layered in the thickness direction of the pad, the thickness direction being the smallest dimension of the pad when in an inflated state.

12. The pad of claim 1, wherein the first and second air impervious chambers are complexly sealable, each air impervious chamber further including a valve for selectively sealing and unsealing the corresponding air impervious chamber through which air is supplied to and extracted from the air impervious chambers.

13. A method of manufacturing an expandable pad comprising:
   forming a first air impervious chamber including a core therein from a thermo-plastic material; and
   adhering at least one first sheet of a thermo-plastic material to the thermo-plastic material of the first air impervious chamber to form a second air impervious chamber including adhering the at least one first sheet to the thermo-plastic material of the first air impervious chamber at two seams to define at least a portion of the second air impervious chamber therebetween, the length between the two seams along the at least one first sheet being greater than the length between the two seams along the thermo-plastic material forming the first air impervious chamber.

14. The method of claim 13 further comprising placing a form between the thermo-plastic material of the first air impervious chamber and the at least one first sheet, the form establishing the length along the at least one first sheet.

15. The method of claim 13, wherein the step of forming a first air impervious chamber includes surrounding the core by second and third sheets of thermo-plastic material that are adhered to one another to form the first air impervious chamber.

16. The method of claim 15, wherein the step of adhering at least one first sheet of thermo plastic material includes adhering the first sheet to the second sheet.

17. The method of claim 16, wherein the step of adhering includes heat welding.

18. The method of claim 16, wherein the step of adhering includes adhesively bonding.

19. The method of claim 14, wherein the step of adhering at least one first sheet includes forming a plurality of elongated tubes formed between the at least one first sheet and the thermo plastic material of the first air impervious chamber, each tube being formed between a pair of seams.

20. The method of claim 19, wherein the same form is used to form the plurality of elongated tubes.

21. A pad comprising:
a first air impervious chamber provided by a plurality of air tubes, each tube being formed between a first and a second thermo-plastic sheet, the first and second thermo-plastic sheets being affixed together at seams on opposite sides of the tubes, wherein a first length between the pair of seams along the first thermo-plastic sheet when inflated is different than a second length between the pair of seams along the second thermo-plastic sheet when inflated; and
a second air impervious chamber, the second air impervious chamber being coupled to the first air impervious chamber, the second air impervious chamber including a core therein.

* * * * *